July 10, 1951  J. G. TRUESDELL  2,559,689
SHEATHED KNIFE
Filed July 13, 1945

John G. Truesdell,
INVENTOR.

BY
McMorrow, Berman & Davidson
attys

Patented July 10, 1951

2,559,689

UNITED STATES PATENT OFFICE 2,559,689

SHEATHED KNIFE

John G. Truesdell, Colorado Springs, Colo.

Application July 13, 1945, Serial No. 604,808

2 Claims. (Cl. 30—162)

It is an object of this invention to provide a cutting tool having a combined hand grip and shield or sheath slidably and adjustably mounted on said tool handle shank.

It is an object of this invention to provide an attachable and detachable combined hand grip and shield for a cutting tool.

It is an object of this invention to provide a combined hand grip and shield having locking means thereon to lock said grip in various selected positions of adjustment on said tool.

It is an object of this invention to provide a knife and a small axe or hatchet which is adapted for use by prospectors, scouts, huntsmen, etc. It may be carried by them in a suitable scabbard or the like.

Further objects and advantages will be revealed in the detailed description in connection with the drawings forming a part of this specification.

Figure 1:
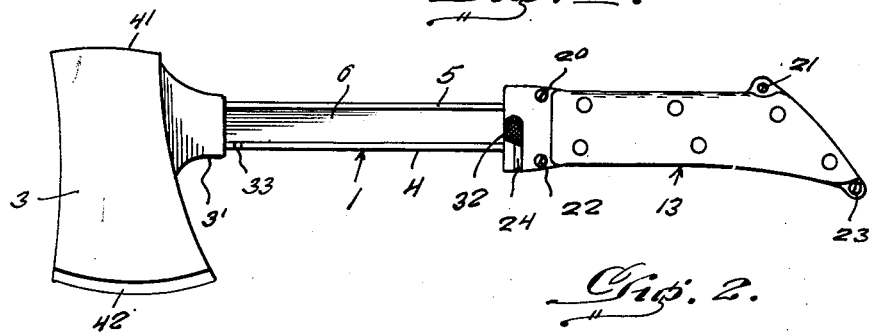
Figure 1 is an elevational side view showing the hand grip in shielding position for the knife.

The drawing presents one embodiment of my invention and it is merely illustrative and not definitive of my invention since changes in detail may be made without departing from the scope of the subject matter claimed.

In the drawings and specification the reference characters identify the parts, portions and other essential details.

The tool comprises a handle shank 1 having a knife or blade 2 on one end of the shank 1 and a small axe or hatchet 3 on its other end. The handle shank 1 resembles in cross-section the general contour of an I-beam having the double flanges 4 and 5 connected by a web 6. The axe 3 has an extension 3' defining a front shoulder or stop on the front end of the shank or I-beam 1.

The blade 2 is broader than the I-beam is wide and forms rear stops or shoulders 7, 8 on the rear end of the handle shank 1. The blade has a cutting edge 9 generally straight throughout the major portion of its length but merging into a sweeping curved portion 10 terminating in a point 11. The forward portion of the blade has a gradual curve along its rear edge 12 defining a downwardly extending sweep portion extending to its tip or point 11. Said point is located outside of the straight marginally extended lines of said flange 4.

Figure 2:
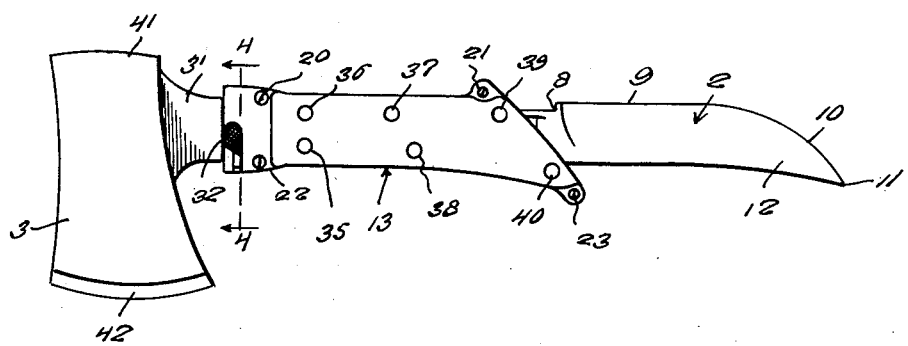
Figure 2 is a side elevational view showing the knife in exposed position relative to the sheath or hand grip.
Figure 3:
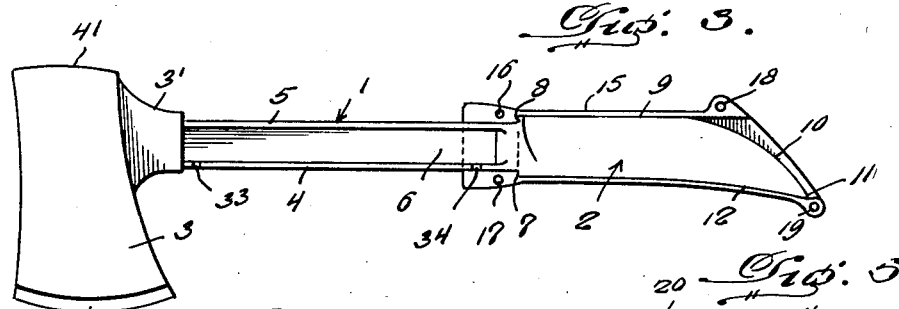
Figure 3 is a side elevational view with one section of the hand grip removed to show the shielding protection afforded by the hand grip.
Figures 4, 5:
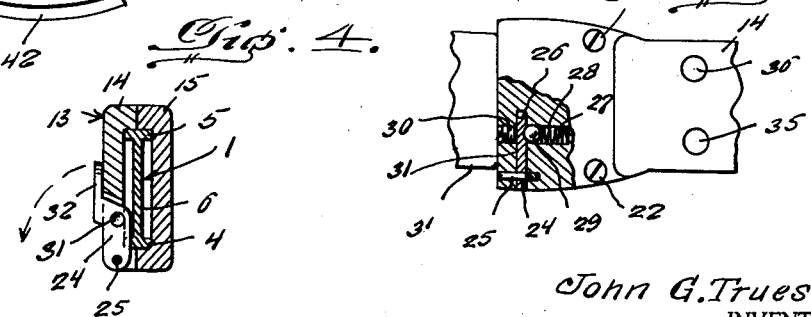
Figure 4 is a transverse sectional view taken on the line 4—4 of Figure 2 looking in the direction of the arrows.
Figure 5 is a fragmentary view on an enlarged scale, showing the latching or locking means in section on one end of the hand grip.

The combined shield and hand grip 13 comprises two sections 14, 15 having aligned apertured portions 16, 17, 18, 19, the apertures in section 15 being screw-threaded to receive screw-threaded bolts 20, 21, 22, 23 to detachably secure the sections 14 and 15 together over the handle shank 1. The front ends of sections 14, 15 have their inner opposed portions recessed to define a bearing portion to surround and slidably receive the handle shank 1. The hand grip 13 is broad at the rear end to provide a hand grip and shield portion which is contoured to receive the curved end of the blade 2. The front end of the hand grip 13 is provided with a swinging latch mechanism including a swinging bolt 24 pivoted at one end on a pivot 25. The bolt 24 is mounted in a slot 26 which is in communication with a transverse bore 27 having located therein a compression spring 28 actuating a ball detent 29 on one side of said slot 26, and on its opposite side a screw plug 30 is fitted in the bore 27 to prevent the ball detent 29 from escaping from the transverse bore 27. The swinging bolt 25 is provided with a depression, recess or dent 31 which is adapted to receive a portion of the ball detent 29 when the bolt 24 is in latched position, as shown in Figure 5. The latch bolt is provided with an offset manipulating tab 32 which may be milled or otherwise roughened, as indicated in Figures 1 and 2.

The flange 4 is provided with front and rear notches 33 and 34 adapted to receive successively or selectively one edge portion of the bolt 24 whereby the hand grip and shield may be locked in either of front or rear positions. It is to be noted that only two notches 33 and 34 are shown, but it appears clear that any desired number of notches may be provided.

The circles 35, 36, 37, 38, 39 and 40 are mere imitations of rivet heads to display a touch of ornamentation.

The operation and use of the tool herein described appears to be obvious. Figure 1 represents an adjusted position of the hand grip 13 in which the tool may be used as an axe or hatchet or the broad flat striking face 41 of the axe may be used as a hammer.

The hammer face 41 on the axe 3 is opposite to its cutting edge 42.

The condition of adjustment displayed in Figure 1 places the tool in condition to be placed in a scabbard, not shown.

The condition of adjustment in Figure 2 exposes the knife blade 2 in a condition for cutting.

The fact that the hand grip 13 is made of sections bolted together clearly indicates that broken or damaged sections may readily be replaced by new ones.

Likewise, the lock or latch parts displayed in Figure 5 may be readily replaced.

Obviously, the tab 32 may be reduced to provide a finger nail recess, whereby the bolt 24 may be lifted to unlatched condition.

What I claim is:

1. In a cutting tool, a shank, a knife blade positioned in end to end aligned relation with respect to said shank and fixedly secured to the latter, an open-ended hand grip positioned in embracing relation with respect to said shank and mounted on the latter for sliding movement into and out of embracing relation with said knife blade, there being a transverse slot extending through said hand grip, said grip being provided with a longitudinal bore having one end in communication with said slot adjacent one end of the latter, means in said slot and engageable with said shank for positioning said hand grip at a desired position on said shank, said last-named means including a bolt positioned within said transverse slot and mounted adjacent the other end of the latter for swinging movement into and out of engagement with said shank, and resilient means mounted within said bore and coacting with said last named means for retaining said hand grip at said desired position on said shank.

2. In a cutting tool, a shank, a knife blade positioned in end to end aligned relation with respect to said shank and fixedly secured to the latter, an open-ended hand grip positioned in embracing relation with respect to said shank and mounted on the latter for sliding movement into and out of embracing relation with said knife blade, there being a transverse slot extending through said hand grip, said grip being provided with a longitudinal bore having one end in communication with said slot adjacent one end of the latter, means in said slot and engageable with said shank for positioning said hand grip at a desired position on said shank, said last-named means including a bolt positioned within said transverse slot and mounted adjacent the other end of the latter for swinging movement into and out of engagement with said shank, and resilient means mounted within said bore and coacting with said last named means for retaining said hand grip at said desired position on said shank, said last-named means including a ball positioned within said slot and mounted for sliding movement toward and away from said bolt, and resilient means interposed between said ball and the other end of said bore for urging said ball toward said bolt.

JOHN G. TRUESDELL.

REFERENCES CITED

The following references are of record in the file of this patent:

UNITED STATES PATENTS

| Number | Name | Date |
|---|---|---|
| 654,204 | Van Every | July 24, 1900 |
| 1,456,786 | De Luca | May 29, 1923 |
| 1,716,131 | Hodgson | June 4, 1929 |
| 2,280,463 | Williamson | Apr. 12, 1942 |